United States Patent [19]
Lokhoff

[11] Patent Number: 5,323,396
[45] Date of Patent: Jun. 21, 1994

[54] DIGITAL TRANSMISSION SYSTEM, TRANSMITTER AND RECEIVER FOR USE IN THE TRANSMISSION SYSTEM

[75] Inventor: Gerardus C. P. Lokhoff, Eindhoven, Netherlands

[73] Assignee: U.S. Philips Corporation, New York, N.Y.

[21] Appl. No.: 997,158

[22] Filed: Dec. 21, 1992

Related U.S. Application Data

[63] Continuation of Ser. No. 532,462, Jun. 1, 1990, abandoned.

[30] Foreign Application Priority Data

Jun. 2, 1989 [NL] Netherlands .................. 8901402
Feb. 13, 1990 [NL] Netherlands .................. 9000338

[51] Int. Cl.$^5$ .................................................. G10L 3/02
[52] U.S. Cl. .................................. 370/94.1; 370/82; 375/122; 395/2.1
[58] Field of Search .................. 370/94.1, 60, 84, 82, 370/83, 100.1, 103, 105.1, 106, 105.4; 375/25, 26, 122; 360/31, 5-8, 18, 19.1; 381/29, 31, 30, 32-40

[56] References Cited

U.S. PATENT DOCUMENTS

| | | | |
|---|---|---|---|
| 4,464,782 | 8/1984 | Béraud et al. | 375/122 |
| 4,535,472 | 8/1985 | Tomcik | 381/31 |
| 4,569,075 | 2/1986 | Nussbaumer | 381/29 |
| 4,620,311 | 10/1986 | Schouhamer Immink | 375/19 |
| 4,896,362 | 1/1990 | Veldhuis et al. | 381/30 |
| 4,899,384 | 2/1990 | Crouse et al. | 375/122 |
| 4,922,510 | 5/1990 | Brusewitz | 375/122 |

OTHER PUBLICATIONS

"The Critical Band Coder-Digital Encoding of Speech Signals Based on the Perceptual Requirements of the Auditory System", Michael A. Krasner, IEEE, 1980, pp. 327-331.

"Low Bit-Rate Coding of High-Quality Audio Signals", G. Theile et al, EBU Review-Technical, No 230, Aug., 1988, pp. 71-94.

*Primary Examiner*—Douglas W. Olms
*Assistant Examiner*—Dang Ton
*Attorney, Agent, or Firm*—David R. Treacy

[57] ABSTRACT

Digital data are transmitted as packets within frames, at an average frame rate equal to the sampling rate divided by the number of samples per frame. When, as a result of subband or other coding, the number of packets required per frame would not be an integer, frames containing the next lower integer are transmitted, followed by frames containing the next higher integer. Preferably a first portion of each frame contains synchronization information, a second portion contains allocation information, and a third contains samples of, and scale factor information for, the transmitted signal.

33 Claims, 10 Drawing Sheets

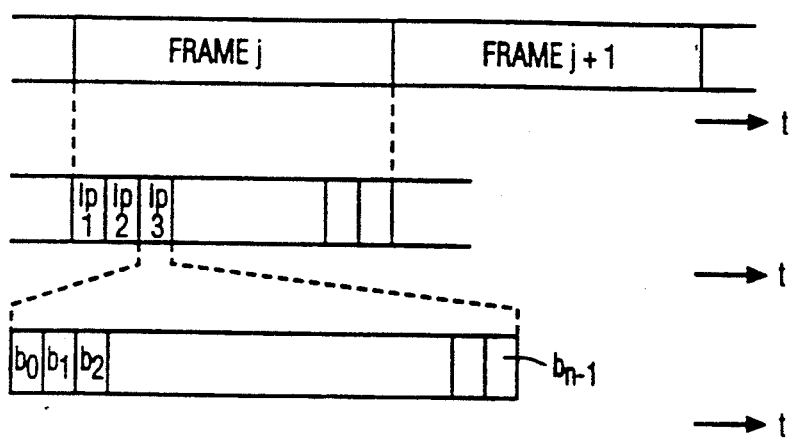
FIG. 1a
FIG. 1b
FIG. 1c
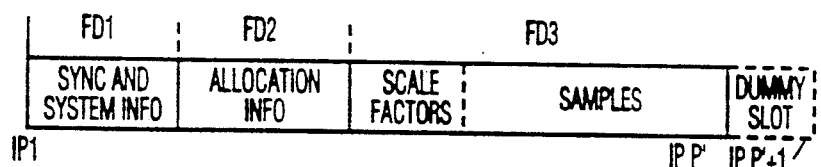
FIG. 2
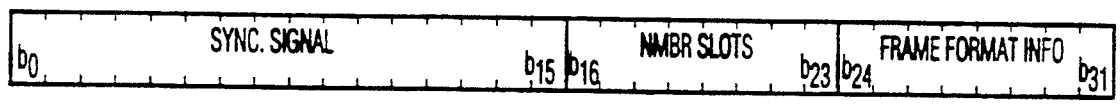
FIG. 3
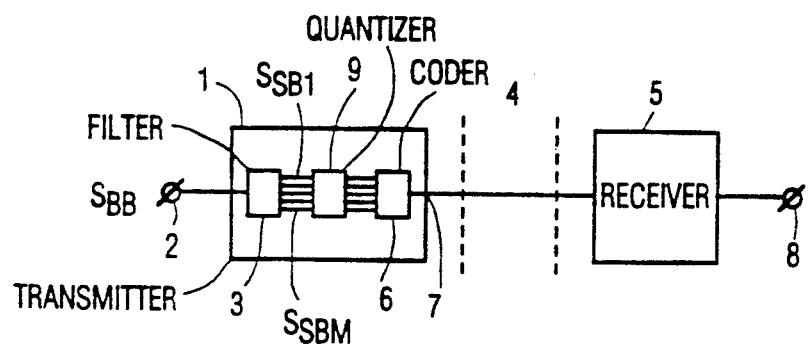
FIG. 4

| BR bitrate (kbits/s) | Fs sample freq. (kHz) | B # slots in a frame |
|---|---|---|
| 128 | 32<br>44.1<br>48 | 48<br>34 + padding<br>32 |
| 192 | 32<br>44.1<br>48 | 72<br>52 + padding<br>48 |
| 256 | 32<br>44.1<br>48 | 96<br>69 + padding<br>64 |
| 384 | 32<br>44.1<br>48 | 144<br>104 + padding<br>96 |

FIG. 5

| bitrate (kbits/s) | total # frames in padding sequence | # frames with a dummy slot |
|---|---|---|
| 128 | 147 | 122 |
| 192 | 49 | 12 |
| 256 | 147 | 97 |
| 384 | 49 | 24 |

FIG. 6

| | | | | |
|---|---|---|---|---|
| Bit 24 : | | Frame type | 0 | format A |
| | | | 1 | format B |
| Bits 25 and 26: | | Copyright | 0 0 | no copyright, own rec. |
| | | | 0 1 | no copyright, software |
| | | | 1 0 | copyright, own recording |
| Bits 27 - 31 : | | Mode indication | 1 1 | copyright, software |

| | | Sample Freq. | Emphasis |
|---|---|---|---|
| 0 0 0 0 0 | Stereo | 48 kHz | no emphasis |
| 0 0 0 0 1 | Stereo | 48 kHz | 50/15 µsec |
| 0 0 0 1 0 | Stereo | 44.1 kHz | no emphasis |
| 0 0 0 1 1 | Stereo | 44.1 kHz | 50/15 µsec |
| 0 0 1 0 0 | Stereo | 32 kHz | no emphasis |
| 0 0 1 0 1 | Stereo | 32 kHz | 50/15 µsec |
| 0 0 1 1 0 | reserved | | |
| 0 0 1 1 1 | reserved | | |
| 0 1 0 0 0 | 2 Chan. | 48 kHz | no emphasis |
| 0 1 0 0 1 | 2 Chan. | 48 kHz | 50/15 µsec |
| 0 1 0 1 0 | 2 Chan. | 44.1 kHz | no emphasis |
| 0 1 0 1 1 | 2 Chan. | 44.1 kHz | 50/15 µsec |
| 0 1 1 0 0 | 2 Chan. | 32 kHz | no emphasis |
| 0 1 1 0 1 | 2 Chan. | 32 kHz | 50/15 µsec |
| 0 1 1 1 0 | reserved | | |
| 0 1 1 1 1 | reserved | | |
| 1 0 0 0 0 | 1 Chan. | 48 kHz | no emphasis |
| 1 0 0 0 1 | 1 Chan. | 48 kHz | 50/15 µsec |
| 1 0 0 1 0 | 1 Chan. | 44.1 kHz | no emphasis |
| 1 0 0 1 1 | 1 Chan. | 44.1 kHz | 50/15 µsec |
| 1 0 1 0 0 | 1 Chan. | 32 kHz | no emphasis |
| 1 0 1 0 1 | 1 Chan. | 32 kHz | 50/15 µsec |
| 1 0 1 1 0 | reserved | | |
| 1 0 1 1 1 | 1 Chan. | 48 kHz | CCITT J.17 |
| 1 1 0 0 0 | Stereo | 48 kHz | CCITT J.17 |
| 1 1 0 0 1 | 2 Chan. | 48 kHz | CCITT J.17 |
| 1 1 0 1 0 | Stereo | 44.1 kHz | CCITT J.17 |
| 1 1 0 1 1 | 2 Chan. | 44.1 kHz | CCITT J.17 |
| 1 1 1 0 0 | Stereo | 32 kHz | CCITT J.17 |
| 1 1 1 0 1 | 2 Chan. | 32 kHz | CCITT J.17 |
| 1 1 1 1 0 | 1 Chan. | 32 kHz | CCITT J.17 |
| 1 1 1 1 1 | 1 Chan. | 44.1 kHz | CCITT J.17 |

FIG. 7

| mode | channel I | channel II |
|---|---|---|
| stereo | left | right |
| 2 channel mono | program I | program II |
| 1 channel mono | program I | not used |

FIG. 8

```
allocation      length of samples
info            in bits

0000            -       (no samples or scale factors transferred)
0001            2
0010            3
0011            4
0100            5
0101            6
0110            7
0111            8
1000            9
1001            10
1010            11
1011            12
1100            13
1101            14
1110            15
1111            not used to prevent incorrect sync detection
```

FIG.9

```
slot 2:
I-1    II-1   I-2    II-2   I-3    II-3   I-4    II-4
slot 3:
I-5    II-5   I-6    II-6   I-7    II-7   I-8    II-8
slot 4:
I-9    II-9   I-10   II-10  I-11   II-11  I-12   II-12
slot 5:
I-13   II-13  I-14   II-14  I-15   II-15  I-16   II-16
slot 6:
I-17   II-17  I-18   II-18  I-19   II-19  I-20   II-20
slot 7:
I-21   II-21  I-22   II-22  I-23   II-23  I-24   II-24
slot 8:
I-25   II-25  I-26   II-26  I-27   II-27  I-28   II-28
slot 9:
I-29   II-29  I-30   II-30  I-31   II-31  I-32   II-32
```

FIG.10

```
slot 2:
I-1    II-1   I-2    II-2   I-3    II-3   I-4    II-4
slot 3:
I-5    II-5   I-6    II-6   I-7    II-7   I-8    II-8
slot 4:
I-9    II-9   I-10   II-10  I-11   II-11  I-12   II-12
slot 5:
I-13   II-13  I-14   II-14  I-15   II-15  I-16   II-16
```

FIG.11

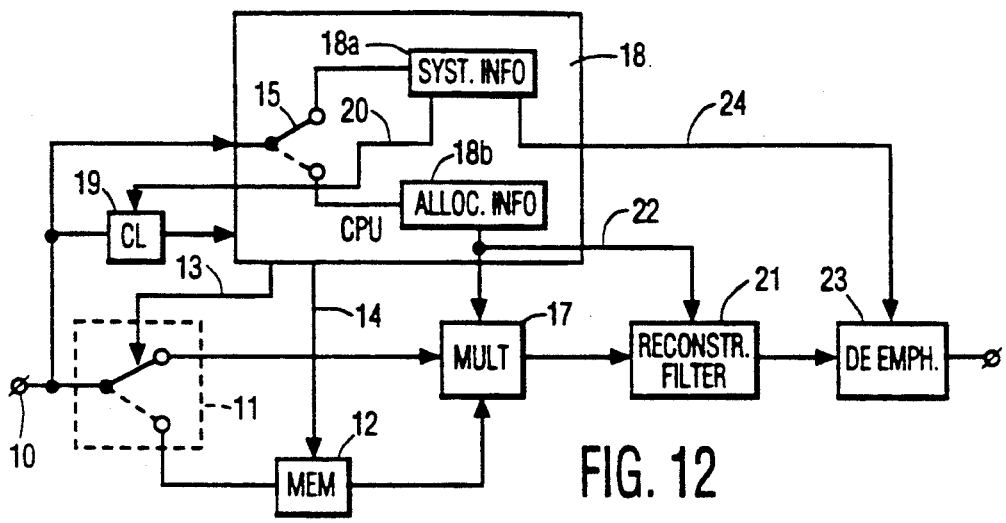
FIG. 12
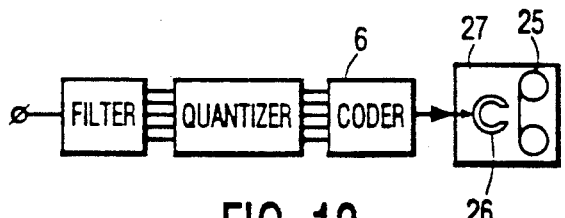
FIG. 13
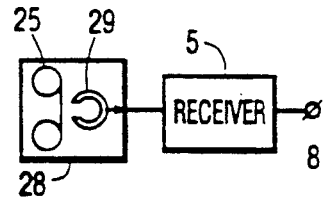
FIG. 14
FIG. 15a
FIG. 15b
FIG. 15c
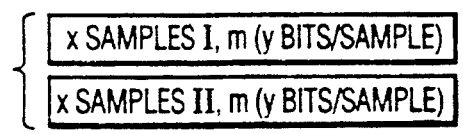
FIG. 15d Bits 16 to 19 : bitrate index

| BR bitrate (kbits/sec.) | BR index | sample frequency Fs | | |
|---|---|---|---|---|
| | | 48 kHz # slots | 44.1 kHz # slots | 32 kHz # slots |
| 32 | 1 | 8 | 8 | 12 |
| 64 | 2 | 16 | 17 | 24 |
| 96 | 3 | 24 | 26 | 36 |
| 128 | 4 | 32 | 34 | 48 |
| 160 | 5 | 40 | 43 | 60 |
| 192 | 6 | 48 | 52 | 72 |
| 224 | 7 | 56 | 60 | 84 |
| 256 | 8 | 64 | 69 | 96 |
| 288 | 9 | 72 | 78 | 108 |
| 320 | 10 | 80 | 87 | 120 |
| 352 | 11 | 88 | 95 | 132 |
| 384 | 12 | 96 | 104 | 144 |
| 416 | 13 | 104 | 113 | 156 |
| 448 | 14 | 112 | 121 | 168 |
| | | | + padding | |

Bits 20 and 21 : Sample Frequency

```
0 0     44.1 kHz
0 1     48   kHz
1 0     32   kHz
1 1     reserved
```

Bit 22 : padding bit

'1' if the frame contains a 'dummy' slot, Otherwise '0'

Bit 23 : Future Use          reserved for future use,
                             '0' for the time being.

FIG.19

Bits 24 and 25 : Mode indication 0 0    stereo
    0 1    intensity stereo
    1 0    bilingual
    1 1    mono Bits 26 and 27 : Intensity stereo mode switches :

0 0    subbands  5 - 32 in intensity stereo mode
    0 1    subbands  9 - 32 in intensity stereo mode
    1 0    subbands 13 - 32 in intensity stereo mode
    1 1    subbands 17 - 32 in intensity stereo mode Bit 28 : Copyright    0    no copyright
                                  1    copyright protected Bit 29 : Original/Home Copy    0    Copy
                                              1    Original Bits 30 and 31 : Emphasis    0 0    no emphasis
                                      0 1    50/15 μsec emphasis
                                      1 0    reserved
                                      1 1    CCITT J.17

FIG.20

Mono mode :

M = mono signal

```
slot 2:
     M-1   M-2   M-3   M-4   M-5   M-6   M-7   M-8
slot 3:
     M-9   M-10  M-11  M-12  M-13  M-14  M-15  M-16
slot 4:
     M-17  M-18  M-19  M-20  M-21  M-22  M-23  M-24
slot 5:
     M-25  M-26  M-27  M-28  M-29  M-30  M-31  M-32
```

FIG.21

Intensity Stereo mode :

L = left channel, R = right channel, M = mono signal

Switch bits (bits 26 and 27) are 0 0 :

```
slot 2:
      L-1   R-1   L-2   R-2   L-3   R-3   L-4   R-4
slot 3:
      M-5   M-6   M-7   M-8   M-9   M-10  M-11  M-12
slot 4:
      M-13  M-14  M-15  M-16  M-17  M-18  M-19  M-20
slot 5:
      M-21  M-22  M-23  M-24  M-25  M-26  M-27  M-28
slot 6:
      M-29  M-30  M-31  M-32
```

FIG. 22a

Switch bits are 0 1 :

```
slot 2:
      L-1   R-1   L-2   R-2   L-3   R-3   L-4   R-4
slot 3:
      L-5   R-5   L-6   R-6   L-7   R-7   L-8   R-8
slot 4:
      M-9   M-10  M-11  M-12  M-13  M-14  M-15  M-16
slot 5:
      M-17  M-18  M-19  M-20  M-21  M-22  M-23  M-24
slot 6:
      M-25  M-26  M-27  M-28  M-29  M-30  M-31  M-32
```

FIG. 22b

Switch bits are 1 0 :

```
slot 2:
      L-1   R-1   L-2   R-2   L-3   R-3   L-4   R-4
slot 3:
      L-5   R-5   L-6   R-6   L-7   R-7   L-8   R-8
slot 4:
      L-9   R-9   L-10  R-10  L-11  R-11  L-12  R-12
slot 5:
      M-13  M-14  M-15  M-16  M-17  M-18  M-19  M-20
slot 6:
      M-21  M-22  M-23  M-24  M-25  M-26  M-27  M-28
slot 7:
      M-29  M-30  M-31  M-32
```

FIG. 22c

Switch bits are 1 1 :

```
slot 2:
      L-1   R-1   L-2   R-2   L-3   R-3   L-4   R-4
slot 3:
      L-5   R-5   L-6   R-6   L-7   R-7   L-8   R-8
slot 4:
      L-9   R-9   L-10  R-10  L-11  R-11  L-12  R-12
slot 5:
      L-13  R-13  L-14  R-14  L-15  R-15  L-16  R-16
slot 6:
      M-17  M-18  M-19  M-20  M-21  M-22  M-23  M-24
slot 7:
      M-25  M-26  M-27  M-28  M-29  M-30  M-31  M-32
```

FIG. 22d

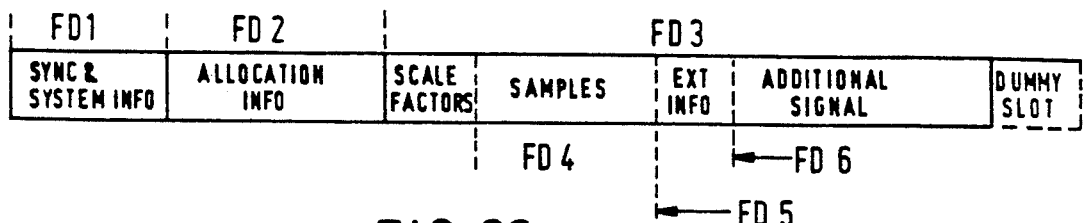
FIG. 23
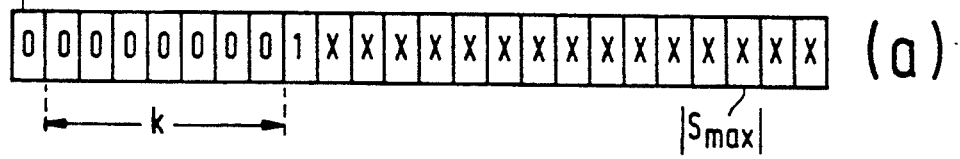
FIG. 24
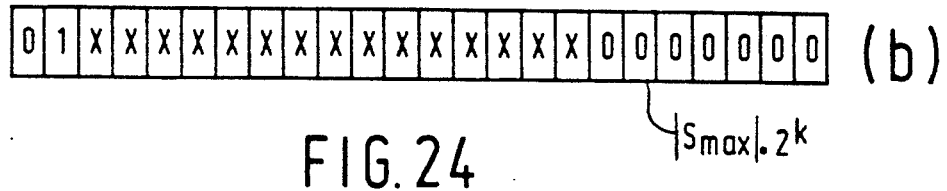
FIG. 25
FIG. 26

DIGITAL TRANSMISSION SYSTEM, TRANSMITTER AND RECEIVER FOR USE IN THE TRANSMISSION SYSTEM

This is a continuation of application Ser. No. 07/532,462 filed Jun. 1, 1990 now abandoned.

BACKGROUND OF THE INVENTION

The invention relates to a digital transmission system comprising a transmitter and a receiver, for transmitting a wide-band digital signal having sample frequency $F_s$, for example a digital audio signal, via a transmission medium, and for receiving said signal; and more particularly to such a system which transmits a second digital signal which comprises consecutive frames, and each frame comprising a plurality of information packets, each information packet comprising N bits, N being larger than 1. The receiver comprises a decoder having an input for receiving the second digital signal, and a decoder has an output coupled to an output terminal to supply the wide-band digital signal.

The invention also relates to a transmitter and a receiver for use in the transmission system, to a transmitter in the form of a device for recording the second digital signal in a track on a record carrier, to a record carrier obtained by means of the transmitter, and to a receiver in the form of a device for reading the second digital signal from the track on the record carrier.

A transmission system of the type defined in the opening sentence is known from the article "The Critical Band Coder—Digital Encoding of Speech signals based on the Percentual requirements of the Auditory System" by M.E. Krasner in Proc. IEEE ICASSP 80, Vol. 1, pp 327-331, Apr. 9-11, 1980. This article relates to a transmission system in which the transmitter employs a subband coding system and the receiver employs a corresponding subband decoding system, but the invention is not limited to such a coding system, as will become apparent hereinafter.

In the system known from said publication the speech signal band is divided into a plurality of subbands whose bandwidth approximately corresponds to the bandwidths of the critical bands of the human ear in the respective frequency ranges (cf. FIG. 2 in the article of Krasner). This division has been selected because on the ground of psycho-acoustic experiments it is foreseeable that the quantisation noise in such a subband will be masked to an optimum extent by the signals in this subband if in the quantisation allowance is made for the noise-masking curve of the human ear (this curve gives the threshold value for noise masking in a critical band by a single tone in the centre of the critical band, cf. FIG. 3 in the article by Krasner).

In the case of a high-quality digital music signal, which in conformity with the Compact Disc Standard is represented by 16 bits per signal sample in the case of a sample frequency of $1/T=44.1$ kHz, it is found that with a suitably selected bandwidth and a suitably selected quantisation for the respective subbands the use of this known subband-coding system yields quantised output signals of the coder which can be represented by an average number of approximately 2.5 bits per signal sample, the quality of the replica of the music signal not differing perceptibly from that of the original music signal in substantially all passages of substantially all kinds of music signals.

The subbands need not necessarily correspond to the bandwidths of the critical bands of the human ear. Alternatively, the subbands may have other bandwidths, for example they may all have the same bandwidth, provided that allowance is made for this in determining the masking threshold.

SUMMARY OF THE INVENTION

It is an object of the invention to provide a number of steps for the transmission system, in particular a very specific choice for the format with which the digital wide-band signal, after conversion into the second digital signal, can be transmitted via the transmission medium, in such away that a flexible and highly versatile transmission system is obtained. This is to be understood to mean that the transmitter should be capable of converting wide-band digital signals of different formats (which formats differ inter alia in respect of the sample frequency $F_S$ of the wide-band digital signal, which may have different values such as 32 kHz, 44.1 kHz and 48 kHz, as laid down in the digital audio interface standard of the AES and the EBU) into the second digital signal.

Similarly, the receiver should be capable of deriving a wide-band signal of the correct format from said second digital signal. In accordance with the invention the number of packets per frame is adjusted such that, if P in the formula $$P = \frac{BR}{N} \times \frac{n_s}{F_s}$$

is an integer, where BR is the bit rate of the second digital signal; $n_s$ is the number of samples of the wide-band digital signal whose corresponding information, which belongs to the second digital signal, is included in one frame of the second digital signal; the number of information packets B in one frame is P. If P is not an integer, the number of information packets in a number V of the frames is P′, P′ being the next lower integer following P, and the number of information packets in the number W of other frames is equal to P′+1, and the numbers V and W are selected to comply exactly with the requirement that the average frame rate of the second digital signal should be substantially equal to $F_s/n_s$ and that a frame should comprise at least a first frame portion including the synchronising information.

The purpose of dividing the frames into B information packets is that for a wide-band digital signal of an arbitrary sample frequency $F_s$ the average frame rate of the second digital signal transmitted by the transmitter is now such that the average duration of a frame in the second digital signal corresponds to the duration occupied by $n_s$ samples of the wide-band signal. Moreover, this enables the synchronisation to be maintained on an information-packet basis, which is simpler and more reliable than maintaining the synchronisation on a bit basis. Thus, in those cases where P is not an integer, the transmitter is capable, at instants at which this possible and also necessary, to provide a frame with P′+1 instead of P′ information blocks, so that the average frame rate of the second digital signal can be maintained equal to $F_s/n_s$. Since in this case the spacing between the synchronising information (synchronising signals or synchronising words) included in the first frame portion of succeeding frames is also an integral multiple of the length of an information packet it remains possible to maintain the synchronisation on an information packet basis.

Preferably, the first frame portion further contains information related to the number of information packets in a frame. In a frame comprising B information packets this information may be equal to the value B. This means that this information corresponds to P' for frames comprising P' information packets and to P'+1 for frames comprising P'+1 information packets.

Another possibility is that this information corresponds to P' for all frames, regardless of whether a frame comprises P' or P'+1 information packets. The additionally inserted (P'+1)th information packet may comprise for example merely "zeros". In that case this information packet does not contain any useful information. Of course, the additional information packet may also be filled with useful information.

The first frame portion may further comprise system information. This may include the sample frequency $F_s$ of the wide-band digital signal applied to the transmitter, copy-protection codes, the type of wide-band digital signal applied to the transmitter, such as a stereo-audio signal or a mono-audio signal, or a digital signal comprising two substantially independent audio signals. However, other system information is also possible, as will become apparent hereinafter. Including the system information makes it possible for the receiver to be also flexible and enables the received second digital signal to be correctly reconverted into the wide-band digital signal. The second and the third frame portions of a frame contain signal information.

The transmitter may comprise a coder comprising signal-splitting means responsive to the wide-band digital signal to generate a second digital signal in the form of a number of M subsignals, M being larger than 1, and comprising means for quantising the respective sub signals. For this purpose an arbitrary transform coding, such as the fast Fourier transform (FFT) may be used. In that case the transmission system is characterized in that the second frame portion of a frame contains allocation information which, for at least a number of sub signals, indicates the number of bits representing the samples of the quantised subsignals derived from said subsignals, and in that the third frame portion contains the samples of at least said quantised subsignals (if present). At the receiving end it is then necessary to apply an inverse transform coding, for example an inverse Fourier transform (IFFT), to recover the wide-band digital signal.

In a system employing subband coding as described above, the transmitter signal-splitting means take the form of analysis-filter means responsive to the wide-band digital signal to generate a number of M subband signals. The analysis-filter means divide the signal band of the wide-band digital signal, using a sample-frequency reduction, into successive subbands having band numbers m increasing with the frequency, and the quantisation means are adapted to quantise the respective subband signals block by block. Such a transmission system is characterized further in that for at least a number of the subband signals the allocation information in the second frame portion of a frame specifies the number of bits representing the samples of the quantised subband signals derived from said subband signals and in that the third frame portion contains the samples of at least said quantised subband signals (if present). This means in fact that the allocation information is inserted in a frame before the samples. This allocation information is needed to enable the continuous serial bit stream of the samples in the third frame portion to be subdivided into the various individual samples of the correct number of bits at the receiving end.

The allocation information may require that all samples are represented by a fixed number of bits per subband per frame. This is referred to as a transmitter based on fixed or static bit allocation. The allocation information may also imply that a number of bits variable in time is used for the samples in a subband. This is referred to as a transmitter based on the system of adaptive or dynamic bit allocation. Fixed and adaptive bit allocation are described inter alia in the publication "Low bit-rate coding of high quality audio signals. An introduction to the MASCAM system" by G. Theile et al, EBU Technical Review, No. 230 (August 1988).

Inserting the allocation information in a frame before the samples in a frame has the advantage that at the receiving end a simpler decoding becomes possible, which can be carried out in real time and which produces only a slight signal delay. As a result of this sequence it is no longer necessary to first store all the information in the third frame portion in a memory in the receiver. Upon arrival of the second digital signal the allocation information is stored in a memory in the receiver. Information content of the allocation information is much smaller than the information content of the samples in the third frame portion, so that a substantially smaller store capacity is needed than in the case that all the samples would have to be stored in the receiver. Immediately upon arrival of the serial data stream of the samples in the third frame portion this data stream can be divided into the various samples having the number of bits specified by the allocation information, so that no previous storage of the signal information is necessary. The allocation information for all the subbands can be included in a frame. However, this is not necessary, as will become apparent hereinafter.

The transmission system may be characterized further in that in addition the third frame portion includes information related to scale factors, a scale factor being associated with at least one of the quantised subband signals contained in the third frame portion, and in that the scale factor information is included in the third frame portion before the quantised subband signals. The samples can be coded in the transmitter without being normalised, i.e. without the amplitudes of a block of samples in a subband having been divided by the amplitude of the sample having the largest amplitude in this block. In that case no scale factors have to be transmitted. If the samples are normalised during coding, scale factor information has to be transmitted to provide a measure of said largest amplitude. If in this case the scale factor information is also inserted in the third frame portion before the samples it is possible that during reception the scale factors to be derived from said scale information are first stored in a memory and the samples are multiplied immediately upon arrival, i.e. without a time delay, by the inverse values of said scale factors.

The scale factor information may be constituted by the scale factors themselves. It is obvious that a scale factor as inserted in the third frame portion may also be the inverse of the amplitude of the largest sample in a block, so that in the receiver it is not necessary to determine the inverse value and consequently decoding can be faster. Alternatively, the values of the scale factors may be encoded prior to insertion in the third frame portion as scale factor information and subsequent transmission. Moreover, it is evident that if after quantisation in the transmitter the subband signal in a subband is zero, which obviously will be apparent from the allocation information for the subband, no scale factor information for this subband has to be transmitted.

The transmission system, in which the receiver comprises a decoder comprising synthesis-filter means responsive to the respective quantised subband signals to construct a replica of the wide-band digital signal, and in which the synthesis-filter means combine the subbands applying sample-frequency increase to form the signal band of the wide-band digital signal, may be characterized in that the samples of the subband signals (if present) are inserted in the third frame portion in a sequence corresponding to the sequence in which said samples are applied to the synthesis-filter means upon reception in the receiver. Inserting the samples in the third frame portion in the same sequence as that in which they are applied to the synthesis-filter means in the receiver also results in fast decoding, which again does not require additional storage of the samples in the receiver before they can be further processed. Consequently, the storage capacity required in the receiver can be limited substantially to the storage capacity needed for the storage of the system information, the allocation information and, if applicable, the scale factor information. Moreover, a limited signal delay is produced, which is mainly the result of the signal processing performed upon the samples.

The allocation information for the various quantised subband signals is suitably inserted in the second frame portion in the same sequence as that in which the samples of the subband signals are included in the third frame portion. The same applies to the sequence of the scale factors. If desired, the frames may also be divided into four portions, the first, the second and the third frame portion being as described hereinbefore. The last (fourth) frame portion in the frame may then contain error-detection and/or error-correction information. Upon reception of this information in the receiver it is possible to apply a correction for errors produced in the second digital signal during transmission already stated, the wide-band digital signal may be a monophonic signal. Alternatively, the wide-band digital signal may be a stereo audio signal made up of a first (left) and a second (right) channel component. If the transmission system is based on a subband-coding system the transmitter will supply subband signals each comprising a first and a second subband-signal component, which after quantisation in the quantisation means are converted to form first and second quantised subband signal components. In this case the frames should also include allocation information and scale-factor information (if the samples have been scaled in the transmitter). The sequence is also important here. It is obvious that the system can be extended to handle a wide-band digital signal comprising more than two signal components.

The inventive steps may be applied to digital transmission systems, for example systems for radiated transmission of digital audio signals (digital audio broadcast) over radio or TV channels. However, other uses are also conceivable. An example of this is a transmission via optical or magnetic media. Optical-media transmissions may be, for example, transmissions via glass fibres or by means of optical discs or tapes. Magnetic-media transmissions are possible, for example, by means of a magnetic disc or a magnetic tape. The second digital signal is then stored in the format as proposed by the invention in one or more tracks of a record carrier, such as an optical or magnetic disc or a magnetic tape. The versatility and flexibility of the transmission system thus resides in the special format with which the information in the form of the second digital signal is transmitted, for example via a record carrier. This is combined with the special construction of the transmitter which is capable of generating this special format for various types of input signals. The transmitter generates the system information required for every type of signal and inserts this information in the data stream to be transmitted. At the receiving end this is achieved by means of a specific receiver, which extracts said system information from the data stream and employs it for a correct decoding.

The information packets then constitute a kind of fictitious units, which are used to define the length of a frame. This means that they need not be explicitly discernible in the information stream of the second digital signal. Moreover, the relationship of the information packets with the existing digital audio interface standard is as defined in the IEC standard no. 958. This standard as normally applied to consumer products defines frames containing one sample of both the left-hand and the right-hand channel of a stereo signal. These samples are represented by means of 16-bit two's complement words. If $N=32$ is selected, one frame of this digital audio interface standard can transmit exactly one information packet of the second digital signal. In the digital audio interface standard the frame rate is equal to the sample rate. For the present purpose the frame rate should be selected to be equal to BR/N. This enables the present ICs employed in standard digital audio interface equipment to be used.

Embodiments of the invention will now be described in more detail, by way of example, with reference to the drawing.

BRIEF DESCRIPTION OF THE DRAWING

FIGS. 1(a)–1(c) show the second digital signal generated by the transmitter and made up of frames, each frame being composed of information packets, FIG. 2 gives the structure of a frame, FIG. 3 shows the structure of the first frame portion of a frame, FIG. 4 gives an example of the transmission system, FIG. 5 is a table specifying the number of information packets B in a frame for specific values of the bit rate BR and the sample frequency $F_s$, FIG. 6 gives the number of frames in a padding sequence and a number of frames thereof comprising an additional information packet (dummy slot) for a number of values of the bit rate BR, FIG. 7 represents the system information included in the first frame portion of a frame, FIG. 8 illustrates the distribution of the digital information about the various (two) channels for a number of modes, FIG. 9 illustrates the significance of the allocation information as inserted in the second frame portion, FIGS. 10 and 11 illustrate the sequence in which the allocation information is stored in the second frame portion for two formats, format A and format B respectively.

FIG. 12 shows an example of a receiver,

FIG. 13 shows a transmitter in the form of a device for recording the second digital signal on a magnetic record carrier, FIG. 14 shows the receiver in the form of a device for reproducing the second digital signal from a magnetic record carrier, FIGS. 15(a)-15(d) show some further possibilities of including the scale factors and samples in the third frame portion of a frame, FIG. 24 illustrates how the scale factors are derived, FIG. 25 illustrates the quantisation of the scaled samples to form q-bit digital representations, and FIG. 26 illustrates the dequantisation of the q-bit digital representations.

DESCRIPTION OF THE PREFERRED EMBODIMENTS

Figure 16:
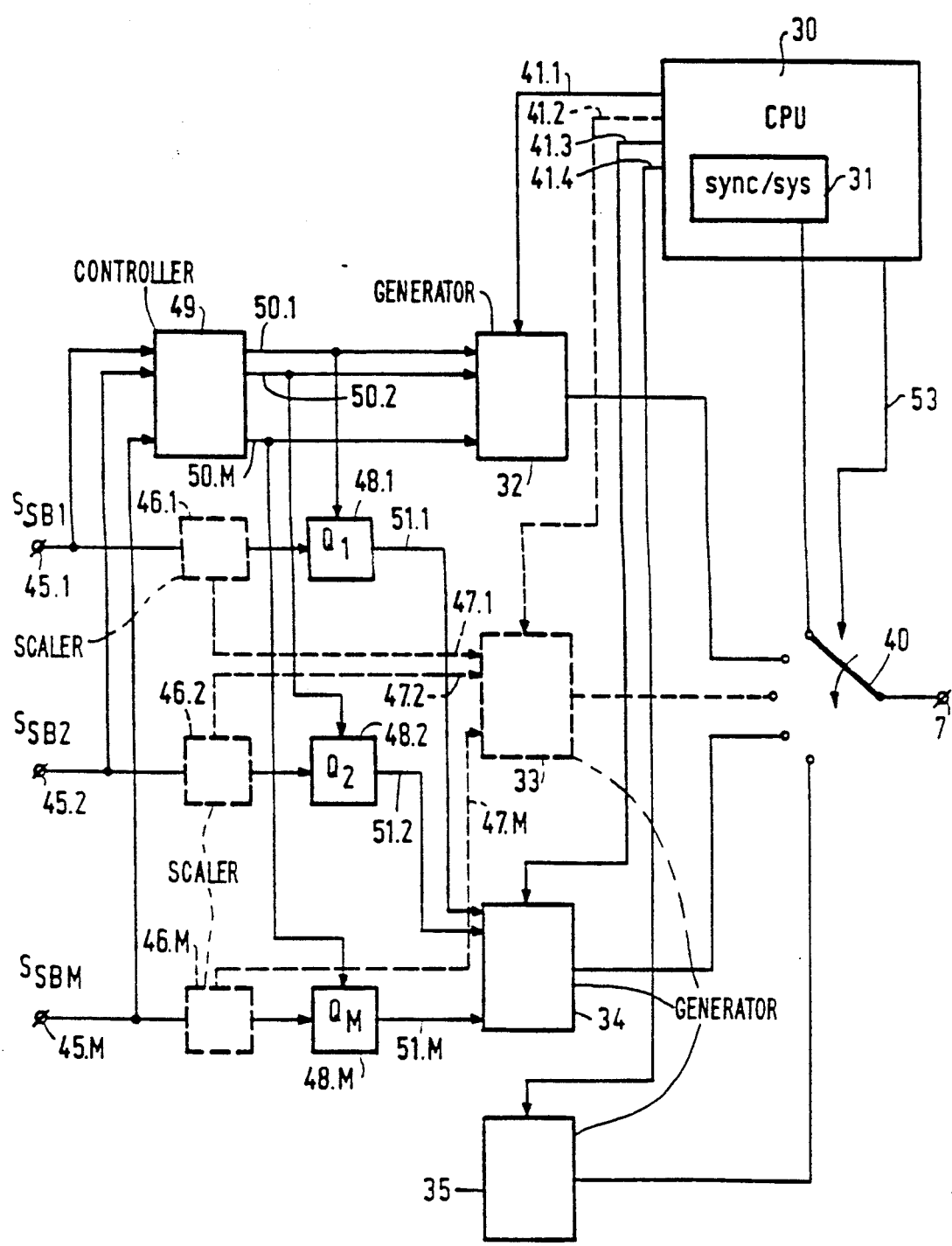
FIG. 16 shows a further modification of the transmitter.

FIGS. 1(a)-1(c) show diagrammatically the second digital signal as generated by the transmitter and transmitted via the transmission medium. The second digital signal takes the form of the serial digital data stream. The second digital signal comprises frames, two such frames, i.e. the frame j and the frame j+1, being given in FIG. 1a. The frames, such as the frame j, comprise a plurality of information packets IP1, IP2, IP3, ..., see FIG. 1b. Each information packet, such as IP3, comprises N bits $b_0, b_1, b_2, \ldots, b_{N-1}$, see FIG. 1c. The number of information packets in a frame depends upon (a) the bit rate BR with which the second digital signal is transmitted via the transmission medium, (b) the number of bits N in an information packet, N being larger than 1, (c) $F_s$, being the sample frequency of the wide-band digital signal, and (d) the number of samples $n_s$ of the wide-band digital signal, the information which corresponds thereto and which after conversion in the transmitter belongs to the second digital signal being included in one, on the average, in the following manner.

The parameter P is computed in conformity with the following formula $$P = \frac{BR}{N} \times \frac{n_s}{F_s}$$

If this computation yields an integer for P the number of information packets B in a frame will be equal to P. If the computation does not result in an integer some frames will comprise P' information packets and the other frames will comprise P'+1 information packets. P' is the next lower integer following P. The number of frames comprising P' and P'+1 information packets is obviously selected in such away that the average frame rate is equal to $F_n/n_s$. Hereinafter it is assumed that N=32 and $n_s=384$. The table in FIG. 5 gives the number of information packets (slots) in one frame for these values for N and $n_s$ and for four values of the bit rate BR and three values for the sample frequency $F_s$. It is evident that for a sample frequency $F_s$ equal to 44.1 kHz the parameter P is not an integer in all cases and that consequently a number of frames comprise 34 information packets and the other frames comprise 35 information packets (when BR is 128 kbit/s). This is also illustrated in FIG. 2. FIG. 2 shows one frame. The frame comprises P' information packets IP1, IP2, ..., IP P'. Sometimes a frame comprises P'+1 information packets. This is achieved by assigning an additional information packet (dummy slot) to the frames of P' information packets. The second column of the table of FIG. 6 gives the number of frames in the padding sequence for a sample frequency of 44.1 kHz and the aforementioned four bit rates. The third column specifies those frames of said number of frames in the sequence which comprise P'+1 information packets. By subtracting the numbers in the second and the third column from each other this yields the number of frames in the sequence comprising P' information packets. The (P'+1)th information packet then need not contain any information. The (P'+1)th information packet may then comprise for example only zeroes. It is obvious that the bit rate BR is not necessarily limited to the four values as given in the tables of FIGS. 5 and 6. Other (for example intermediate) values are also possible. FIG. 2 shows that a frame comprises three frame portions FD1, FD2 and FD3 in this order. The first frame portion FD1 contains synchronising information and system information. The second frame portion FD2 contains allocation information. The third frame portion FD3 contains samples and, when applicable, scale factors of the second digital signal. For a further explanation it is necessary to first describe the operation of the transmitter in the transmission system in accordance with the invention.

FIG. 4 shows diagrammatically the transmission system comprising a transmitter 1 having an input terminal 2 for receiving the wide-band digital signal $S_{BB}$, which may be for example a digital audio signal. In the case of an audio signal, this may be a mono signal or a stereo signal in which case the digital signal comprises a first (left channel) and a second (right channel) signal component. It is assumed that the transmitter comprises a coder for subband coding of the wide-band digital signal and that the receiver consequently comprises a subband decoder for recovering the wide-band digital signal. The transmitter comprises analysis filter means 3 responsive to the digital wide-band signal $S_{BB}$ to generate a plurality of M subband signals $S_{SB1}$ to $S_{SBM}$, which analysis filter means divide the signal band of the wide-band signal $S_{BB}$ with sample-frequency reduction into successive subbands having band numbers M ($1 \leq m \leq M$), which increase with the frequency. All these subbands may have the same bandwidth but, alternatively, the subbands may have different bandwidths. In that case the subbands may correspond, for example, to the bandwidths of the critical bands of the human ear. The transmitter further comprises quantizers for block-by-block quantization of the respective subband signals. These quantizers means are shown in the block bearing the reference numeral 9 in FIG. 4.

Such a subband coder is known per se and is described inter alia in the aforementioned publications by Krasner and by Theile et al. Reference is also made to the published European Patent Application 289,080 to which U.S. Pat. No. 4,896,362 corresponds.

For a further description of the operation of the subband coder reference is made to said publications. These publications are therefore incorporated herewith by reference. Such a subband coder enables a significant data reduction to be achieved, for example a reduction from 16 bits per sample for the wide-band digital signal $S_{BB}$ to for example 4 bits per sample in the signal which is transmitted to the receiver 5 via the transmission medium 4, see FIG. 4. Above $n_s$ is assumed to be 384. This means that there are blocks of 384 samples of the wide-band digital signal, each sample having a length of 16 bits. Now it is also assumed that M=32. Consequently, the wide-band digital signal is split into 32 subband signals in the analysis filter means 3. Now 32 (blocks of) subband signals appear on the 32 outputs of the analysis filter means, each block comprising 12 samples (the subbands have equal width) and each sample having a length of 16 bits. This means that on the outputs of the filter means 3 the information content is still equal to the information content of the block of 384 samples of the signal $S_{BB}$ on the input 2. The means 9 now provide data reduction in that, using the knowledge about masking, the samples in the 32 blocks of 12 samples, each block for one subband, are quantised more roughly and can thus be represented by a smaller number of bits. In the case of a static bit allocation all the samples per subband per frame are expressed in a fixed number of bits. This number can be different for two or more subbands but it can also be equal for the subbands, for example equal to 4 bits. In the case of dynamic bit allocation the number of bits selected for every subband may differ viewed in time, so that sometimes an even larger data reduction or a higher quality with the same bit rate can be achieved.

The subband signals quantised in the block 9 are applied to a generator unit 6. Starting from the quantised subband signals this unit 6 generates the second digital signal as illustrated in FIGS. 1 and 2. This second digital signal, as stated hereinbefore, can be transmitted directly via the medium. However, preferably this second digital signal is first adapted to be transmitted via the transmission medium 4 in a signal converter (not shown). Such a signal converter comprises, for example, an 8-to-10 converter. Such an 8-to-10 converter is described in, for example, the Applicant's European Patent Application 150,082, to which U.S. Pat. No. 4,620,311 corresponds. This converter converts 8-bit data words into 10-bit data words. Moreover, such a signal converter enables an interleaving process to be applied. The purpose of all this is to enable an error correction to be performed on the information to be received at the receiving side.

It is obvious that the signal received from the transmission medium 4 by the receiver 5 should then be de-interleaved and subjected to a 10-to-8 conversion.

Frame Format

The composition and content of the frames will now be explained in more detail. The first frame portion FD1 in FIG. 2 is shown in greater detail in FIG. 3. FIG. 3 clearly shows that the first frame portion now comprises exactly 32 bits and is therefore exactly equal to one information packet, namely the first information packet IP1 of the frame. The first 16 bits of the information packet form the synchronising signal (or synchronising word). The synchronising signal may comprise for example only "ones". The bits 16 to 31 represent the system information. The bits 16 to 23 represent the number of information packets in a frame. This number consequently corresponds to P', both for the frame comprising P' information packets and for frames comprising the additional information packet IP P'+1. P' can be 254 (1111 1110 in bit notation) at the most in order to avoid resemblance to the synchronising signal. The bits 24 to 31 provide frame format information.

FIG. 7 gives an example of the arrangement and significance of this information. Bit 24 indicates the type of frame. In the case of format A the second frame portion has another length (a different number of information packets) than in the case of format B. As will become apparent hereinafter, the second frame portion FD2 in the A format comprises 8 information packets, namely the information packets IP2 to IP9 inclusive and in the B format it comprises 4 information packets, namely the information packets IP2 to IP5 inclusive. The bits 25 and 26 indicate whether copying of the information is allowed. The bits 27 to 31 indicate the function mode. This means:

a) the channel mode, which indicates the type of wide-band signal (as stated hereinbefore this may be a stereo audio signal, a mono audio signal, or an audio signal comprising two different signal components for example representing the same text but in two different languages). FIG. 8 represents the channel mode. It illustrates how the signal components are divided between the two channels (channel I and channel II) in the aforementioned cases.

b) the sample frequency $F_s$ of the wide-band signal.

c) the emphasis which may be applied to the wide-band digital signal in the transmitter. The values 50 and 15 μs are the time constants of the emphasis and CCITT J. The value 17 indicates a specific emphasis standard as defined by the CCITT (Comité Consultative Internationale de Télégraphie et Téléphonie).

The content of the frame portion FD2 in FIG. 2 will be described in more detail with reference to FIGS. 9, 10 and 1. In the A format the second frame portion contains eight information packets. This is because it is assumed that the wide-band digital signal $S_{BB}$ is converted into 32 subband signals (for every signal portion of the digital signal $S_{BB}$). An allocation word having a length of four bits is assigned to every subband. This yields a total of 64 allocation words having a length of 4 bits each, which can be accommodated exactly in eight information packets. In the B format the second frame portion accommodates the allocation information for only half the number of subbands, so that now the second frame portion comprises only 4 information packets.

FIG. 9 illustrates the significance of the four-bit allocation words AW. An allocation word associated with a specific subband specifies the number of bits by which the samples of the subband signal in the relevant subband are represented after quantisation in the unit 9. For example: the allocation word AW which is 0100 indicates that the samples are represented by 5-bit words. Moreover, it follows from FIG. 9 that the allocation word 0000 indicates that no samples have been generated in the relevant subband. This may happen, for example, if the subband signal in an adjacent subband has such a large amplitude that this signal fully masks the subband signal in the relevant subband. Moreover, the allocation word 1111 is not used because it bears much resemblance to the sync word in the first information packet IP1.

FIG. 10 indicates the sequence, in the case that the frame mode is A, in which the allocation words AW, j,m associated with the two channels j, were j=I or II, and the 32 subbands of the sequence number m, m ranging from 1 to 32, are arranged in the second frame portion. The allocation word AWI,1 belonging to the first subband signal component of the first and lowest subband (channel I, subband 1) is inserted first. After this the allocation word AWII,1 belonging to the second subband-signal component of the first and lowest subband (channel II, subband 1) is inserted in the second frame portion FD2. Subsequently, the allocation word AWI,2 belonging to the first subband-signal component of the second and lowest but one subband (channel I, subband 2) is inserted in the frame portion FD2. This is followed by the allocation word AW II,2 belonging to the second subband-signal component of the second subband (channel II, subband 2). This continues until the allocation word AW II,4 belonging to the second subband-signal component of the fourth subband (channel II, subband 4) is inserted in the second frame portion FD2. The second information packet IP2 (slot 2) of the frame, which is the first information packet in the frame portion FD2 of the frame, is then filled exactly. Subsequently, the information packet IP3 (slot 3) is filled with AW I,5; AW II,5; ... AW II,8. This continues in the sequence as illustrated in FIG. 10.

FIG. 10 merely gives the indices j-m of the inserted allocation word AW, j,m. FIG. 11 indicates the sequence for the allocation words in the case of a B-format frame. In this case only allocation words of the subbands 1 to 16 are inserted. The sequence, as is illustrated in FIG. 10, corresponds to the sequence in which the separate samples belonging to a channel j and a subband m are applied to the synthesis filter means upon reception in the receiver. This will be explained in greater detail hereinafter. The serial data stream contains for example only frames in conformity with the A format. In the receiver the allocation information in each frame is then employed for correctly deriving the samples from the information in the third frame portion of said frame. However, the serial data stream may also comprise, more or less alternately, both frames in conformity with the A format and frames in conformity with the B format. However, the frames in conformity with both formats may contain samples for all channels and all subbands in the third frame portion. A frame in conformity with the B format then lacks in fact the allocation information required to derive the samples for the channels I or II of the subbands 17 to 32 from the third frame portion of a B format frame.

The receiver comprises a memory in which the allocation information included in the second frame portion of an A format frame can be stored. If the next frame is a B format frame only the allocation information for the subbands 1 to 16 and the channels I and II in the memory is replaced by the allocation information included in the second frame portion of the B format frame. The samples for the subbands 17 to 32 from the third frame portion of the B format frame are derived from the allocation information for these subbands derived from the preceding A format frame and still present in the memory. The reason for the alternate use of A format frames and B format frames is that for some subbands the allocation information (in the present case the allocation information for the higher subbands 17 to 32), does not change rapidly. Since during quantisation knows the allocation information for the various subbands is available in the transmitter, this transmitter can decide to generate a B format frame instead of an A format frame if the allocation information for the subbands 17 to 32 inclusive does not change (significantly). Moreover, this illustrates that now additional space becomes available for the inclusion of samples in the third frame portion FD3.

For a specific value of P' the third frame portion of a B format frame is four information packets longer than the third frame portion of an A format frame. Consequently, this enables the number of bits by which the samples in the lower subbands 1 to 16 are represented to be increased, so that for these subbands a higher transmission accuracy can be achieved. Moreover, if it is required to quantise the lower subbands more accurately the transmitter can automatically opt for the generation of B format frames. This may then be at the expense of the accuracy with which the higher subbands are quantised.

The third frame portion FD3 in FIG. 2 contains the samples of the quantised subband-signal components for the two channels. If the allocation word 0000 is not present in the frame portion FD2 for any of the subband channels this means that in the present example twelve samples are inserted in the third frame portion FD3 for each of the 32 subbands and 2 channels. This means that there are 768 samples in total.

Scale Factors

In the transmitter the samples may be multiplied by a scale factor prior to their quantisation. For each of the subbands and channels the amplitudes of the twelve samples are divided by the amplitude of that sample of the twelve samples which has the largest amplitude. In that case a scale factor should be transmitted for every subband and every channel in order to enable the inverse operation to be performed upon the samples at the receiving end. For this purpose the third frame portion then contains scale factors SF j,m, one for each of the quantised subband-signal components in the various subbands. In the present example, scale factors are represented by 6-bit numbers, the most significant bit first, the values ranging from 000000 to 111110. The scale factors of the subbands to which these are allocated, i.e. whose allocation information is non-zero, are transmitted before the transmission of the samples begins. This means that the scale factors are accommodated in the leading part of the frame portion FD3 before the samples. This enables a rapid decoding in the receiver 5 to be achieved without the necessity of storing all the samples in the receiver, as will become apparent hereinafter. A scale factor SF j,m can thus represent the value by which the samples of the signal in the j-th channel of the m-th subband have been multiplied. Conversely, the number one divided by said value may be stored as the scale factor so that at the receiving end it is not necessary to divide the scale factors before the samples, are scaled up to correct values.

For the frame format A the maximum number of scale factors is 64. If the allocation word AW j,m for a specific channel j and a specific subband m has the value 0000, which means that for this channel and this subband no samples are present in the frame portion FD3, it will not be necessary to include a scale factor for this channel and this subband. The number of scale factors is then smaller than 64. The sequence in which the scale factors SF j,m are inserted in the third frame portion FD3 is the same as that in which the allocation words have been inserted in the second frame portion. The sequence is therefore as follows:

SF I,1; SF II,1; SF I,2; SF II,2; SF I,3; SF II,3; ... SF I,32; SF II,32.

If it is not necessary to insert a scale factor the sequence will not be complete. The sequence may then be for example:

... SF I,4; SF I,5; SF II,5; SF II,6; ....

In this case the scale factors for the fourth subband of channel II and the sixth subband of channel I are not inserted. If the frame is a B format frame it may still be considered to insert scale factors in the third frame portion for all the subbands and all the channels. However, this is not necessarily so. In this case it would be possible to insert scale factors in the third frame portion of the frame for the subbands 1 to 16 only. In the receiver this requires a memory in which all scale factors can be stored at the instant at which a previously arriving A format frame is received. Subsequently upon reception of the B format frame only the scale factors for the subbands 1 to 16 are replaced by the scale factors included in the B format frame. The scale factors of the previously received A format frame for the subbands 17 to 32 are then used in order to restore the samples for these subbands included in the third frame portion of the B format frame to the correct scale.

The samples are inserted in the third frame portion FD3 in the same sequence as the allocation words and the scale factors, one sample for every subband of every channel in succession. This means: first all the first samples for the quantised subband signals for all the subbands of both channels, then all the second samples, . . . etc. The binary representation of the samples is arbitrary, the binary word comprising only "ones" preferably not being used again.

The second digital signal generated by the transmitter 1 is subsequently applied to a transmission medium 4 via the output 7, and by means of the transmission medium 4 this signal is transferred to the receiver 5. The transmission via the transmission medium 4 may be a wireless transmission, such as for example a radio transmission channel. However, other transmission media are also possible. In this respect an optical transmission may be envisaged, for example via optical fibres or optical record carriers, such as Compact-Disc-like media, or a transmission by means of magnetic record carriers utilising RDAT or SDAT-like recording and reproducing technologies, for which reference is made to the book "The art of digital audio" by J.Watkinson, Focal press, London 1988.

The Receiver

The receiver 5 comprises a decoder, which the signal encoded in the coder 6 of the transmitter 1 and converts it into a replica of the wide-band digital signal supplied to the output 8.

FIG. 12 shows a more detailed version of the receiver 5 in FIG. 4. The coded signal (the second digital signal) is applied to a unit 11 via the terminal 10. The essential information in the incoming signal is contained in the scale factors and the samples. The remainder of the information in the second digital signal is merely required for a "correct bookkeeping", to allow a correct decoding. The decoding process is repeated for every incoming frame. The transmitter first derives the synchronising and system information from the frames.

The unit 19 each time detects the sync words situated in the first 16 bits of the first frame portion of every frame. Since the sync words of successive frames are each time spaced apart by an integral multiple of P' or P'+1 information packets, the sync words can be detected very accurately.

Once the receiver is in synchronism the sync word can be detected in the unit 19. In the unit 19 a time window having, for example, a length of one information packet is opened after each occurrence of P' information packets, so that only that part of the incoming information is applied to the sync word detector in the unit 19. If the sync word is not detected the time window remains open for the duration of another information packet because the preceding frame may be a frame comprising P'+1 information packets. From these sync words a PLL in the unit 19 can derive a clock signal to control the central processing unit 18.

It is evident from the above that the receiver should know how many information packets are contained in one frame. For this purpose the system information is applied to the switching means 15 via an input of the processing unit 18, which switching means are then in the position shown. The system information can now be stored in a memory 18a of the processing unit 18. The information relating to the number of information packets in a frame can be applied to the unit 19 via the control-signal line 20 to open the time window at the correct instants for sync-word detection. When the system information is received the switch 15 is changed over to the lower position. The allocation information in the second frame portion stored in the memory 18b. If the allocation information in the incoming frame does not comprise an allocation word for all the subbands and channels this will have become apparent already from the detected system information. This may be for example the information indicating whether the frame is an A-format or a B-format frame. Thus, under the influence of the relevant information contained in the system information the processing unit 18 will store the received allocation words at the correct location in the allocation memory 18b.

It is obvious that in the present example the allocation memory 18b comprises 64 storage positions. If no scale factors are transmitted, the elements bearing the reference numerals 11, 12 and 17 may be dispensed with and the content of the third frame portion of a frame is applied to the synthesis filter means via the input 10, which is coupled to the input of said filter means via the connection 16. The sequence in which the samples are applied to the filter means 21 is the same as the sequence in which the filter means 21 process the samples in order to reconstruct the wide-band signal. The allocation information stored in the memory 18b is required in order to divide the serial data stream of samples into individual samples in the filter means 21, each sample having the correct number of bits. For this purpose the allocation information is applied to the filter means 21 via the line 22. The receiver further comprises a deemphasis unit 23 which subjects the reconstructed digital signal supplied by the filter 21 to deemphasis. For a correct deemphasis the relevant information in the bits 24 to 31 of the first frame portion should be applied from the memory 18a to the deemphasis unit 23 via the line 24.

If the third frame portion also contains the scale factors SF j,m the receiver will comprise the switch 11, the memory 12 and the multiplier 17. All the instant at which the third frame portion FD3 of a frame arrives the switch 11 is in the lower position under the influence of a control signal applied by the processing unit 18 via the line 13. The scale factors can now be applied to the memory 12. Under the influence of address signals applied to the memory 12 by the processing unit 18 via the line 14 the scale factors are stored at the correct locations in the memory 12. The memory 12 has 64 locations for the storage of the 64 scale factors. Again, when a B-format frame is received, the processing unit 18 applies such address signals to the memory 12 that only the scale factors for the subbands 1 to 16 are overwritten by the scale factors in the B-format frame. Subsequently, the switch 11 changes over to the shown (upper) position under the influence of the control signal applied via the line 13, so that the samples are applied to the multiplier 17. Under the influence of the allocation information, which is now applied to the multiplier 17 via the line 22, the multiplier first derives the individual samples of the correct bit length form the serial data stream applied via the line 16. Subsequently, the samples are multiplied so as to restore them to the correct values of the samples prior to scaling-down in the transmitter. If the scale factors stored in the memory 12 are the scale factors by which the samples have been scaled down in the transmitter these scale factors should first be inverted (one divided by the scale factor) and should then be applied to the multiplier 17. Obviously, it is also possible to invert the scale factors upon reception before they are stored in the memory 12.

If the scale factors in the frames are already equal to the value by which the samples should be scaled up during reception they can be stored directly in the memory 12 and they can be applied directly to the multiplier 17. It is evident that no memory is required to store all these samples before the signal processing performed upon the samples contained in the frame begins. At the instant at which a sample arrives via the line 16 all the information required for processing this sample is already available, so that processing can be carried out immediately. This entire process is effected under the influence of control signals and clock signals applied to all the parts of the transmitter by the processing unit 18.

By no means all the control signals are shown. This is not necessary because the operation of the receiver will be obvious to those skilled in the art. Under control of the processing unit 18 the multiplier 17 multiplies the samples by the appropriate multiplication factors. The samples, which have now been restored to the correct amplitude, are applied to the reconstruction filter 18 in which the subband signals are reconverted to form the wide-band digital signal. A further description of the receiver is not necessary because such receivers are generally known, see for example the publication "Low bit rate coding of high-quality audio signals. An introduction to the MASCAM system" by G. Theile et al in EBU Technical Review, no. 230, August 1988. Moreover, it will be evident that if the system information is also transmitted the receiver can be highly flexible and can correctly decode the signals even in the case of second digital signals with different system information.

Other Embodiments

FIG. 13 shows diagrammatically yet another embodiment of the transmitter, which now takes the form of a recording device for recording the wide-band digital signal on the record carrier, in the present case a magnetic record carrier 25. The encoder 6 supplies the second digital signal to a recording device 27 comprising a write head 26 by means of which the signal is recorded in a track on the record carrier. It is then possible to record the second digital signal in a single track on the record carrier, for example by means of a helical-scan recorder, in which case the single track is then in fact divided into juxtaposed tracks which are inclined relative to the longitudinal direction of the record carrier. An example of this is an RDAT-like recording method. Another method is to split the information and simultaneously recording the split information in a plurality of juxtaposed tracks which extend on the record carrier in the longitudinal direction of the record carrier. For this the use of an SDAT-like recording method may be considered. A comprehensive description of the two above methods can be found in the aforementioned book "The art of a digital audio" by J. Watkinson. Again it is to be noted that the signal supplied by the unit 6 may be first be encoded in a signal converter. This encoding may again be an 8-to-10 conversion followed by an interleaving process, as described with reference to FIG. 4. If the encoded information is recorded on the record carrier in a plurality of adjacent parallel track, this signal converter should also be capable of assigning the encoded information to the various tracks.

FIG. 14 shows diagrammatically an embodiment of the receiver 5, which in the present case takes the form of a read device for reading the record carrier 25 on which the wide-band digital signal has been recorded in the form of the second digital signal by means of the device shown in FIG. 13. The second digital signal is read from a track on the record carrier by the read head 29 and is applied to the receiver 5, which may be for example of a construction as shown in FIG. 12. Again the read device 28 may be constructed to carry out an RDAT-like or an SDAT like reproducing method. Both methods are again described comprehensively in the aforementioned book by Watkinson. If the signal supplied by the unit 6 in the recording device shown in FIG. 13 has been converted, for example in an 8-to-10 conversion and in an interleaving step, the encoded signal read from the record carrier 25 should first be de-interleaved and should be subjected to 10-to-8 conversion. Moreover, if the encoded signal has been recorded in a plurality of parallel tracks the reproducing unit shown in FIG. 14 should arrange the information read from these tracks in the correct sequence before further processing is applied.

FIGS. 15($a$)–15($d$) show a number of other possibilities of inserting the scale factors and the samples in the third frame portion FD3 of a frame. FIG. 15$a$ illustrates the above described method in which the scale factors SF for all the subbands m and channels (I or II) are inserted in the third frame portion before the samples. FIG. 15$b$ illustrates the same situation as FIG. 15$a$, but in this case it diagrammatically represents the storage capacity for the scale factors SF I,m and SF II,m and the associated x samples for these two channels in the subband m. FIG. 15$b$ shows the samples for the two channels in the subband m combined to blocks, whereas normally they are distributed within the third frame portion. The samples have a length of y bits. In the above example x is 12 and y is now taken to be 8. FIG. 15$c$ shows another format. The two scale factors for the first and the second channel in the subband are still present in the third frame portion. However, instead of the x samples for both channels (the left and right channels for a stereo signal) in the subband m (i.e. 2×samples in total) only x samples for the subband m are included in the third frame portion. These x samples are obtained, for example, by adding corresponding samples in each of the two channels to one another. In fact, a monophonic signal is obtained in this subband m. The x samples in FIG. 15c each have a length of z bits. If z is equal to y this saves room in the third frame portion, which can be used for samples requiring a more accurate quantisation. It is alternatively possible to express the x samples of the mono signal in Z=2y (=16) bits. Such a signal processing is applied if the phase difference between the left-hand and the right-hand signal component in a subband is irrelevant but the waveform of the monophonic signal is important. This applies in particular to signals in higher subbands because the phase-sensitivity of the ear for the frequency in these subbands is smaller. By expressing the x samples of the mono signal in 16 bits the waveform is quantised more accurately, while the room occupied by these samples in the third frame portion is equal to that in the example illustrated in FIG. 15b. Yet another possibility is to represent the samples in FIG. 15 by for example 12 bits. The signal definition is then more accurate than in the example illustrated in FIG. 15b whilst in addition room is saved in the third frame portion. When at the receiving end the signals included in the third frame portion as illustrated in FIG. 15c are reproduced a stereo effect is obtained which is referred to as "intensity stereo". Here, only the intensities of the left-channel and the right-channel signals (in the subband m) can differ because of a different value for the scale factors SF I,m and SF II,m.

FIG. 15d gives still another possibility. In this case there is only one scale factor SFm for both signal components in the subband m. This is a situation which may occur in particular for low-frequency subbands. Yet another possibility, which is not shown, is that the x samples for the channels I and II of the subband m, as in FIG. 15b, do not have associated scale factors SF I,m and SF II,m. Consequently, these scale factors are not inserted in the same third frame portion. In this case the scale factors SF I,m and SF II,m included in the third frame portion of a preceding frame must be used for scaling up the samples in the receiver.

All the possibilities described with reference to FIG. 15 can be employed in the transmitter in order to achieve a most efficient data transfer via the transmission medium. Thus, frames as described with reference to FIG. 15 may occur alternately in the data stream. It will be appreciated that, if the receiver should yet be capable of correctly decoding these different frames, information about the structure of these frames should be included in the system information.

The Transmitter

FIG. 16 shows the transmitter in more detail. The Figure shows how the various items of information can be combined to form the serial data stream as given in FIGS. 1, 2 and 3. FIG. 16 in fact shows a more detailed version of the encoder 6 in the transmitter 1. The encoder comprises a central processing unit 30, which controls a number of devices in the encoder. The encoder comprises a generator 31 included in the processing unit 30 for generating the synchronising information and the system information, as described with reference to FIG. 3, a generator 32 for defining the allocation information, a generator 33 (optional) for determining the scale factors, a generator 34 for defining the samples for a frame. The generator 35 is a generator which is capable of generating the additional information packet IP P'+1. The outputs of these generators are coupled to associated inputs of switching means 40 in the form of a five-position switch whose output is coupled to the output 7 of the encoder 6. The switching means 40 are also controlled by the processing unit 30. The various generators are controlled via the lines 41.1 to 41.4.

The operation of the transmitter will be described for a mono signal divided into M subband signals. These M subband signals $S_{SB1}$ to $S_{SBM}$ are applied to the terminals 45.1, 45.2, . . . , 45.M. For example, blocks of 12 samples of each of the subband signals are taken together. In the unit 46.1 to 46.M, if present, the twelve samples in a block are scaled to the amplitude of the largest sample in the block. The M scale factors are applied to the unit 33 (if present) via the lines 47.1 to 47.M. The subband signals are applied both to the M quantisers 48.1 to 48.M and to a unit 49. For every subband the unit 49 defines the number of bits with which the relevant subband signal should be quantised. This information is applied to the respective quantisers 48.1 to 48.M via the lines 50.1 to 50.M, so that these quantisers correctly quantise the 12 samples of each of the subband signals. Moreover this (allocation) information is applied to the unit 32. The samples of the quantised subband signals are applied to the unit 34 via the lines 51.1 to 51.M. The units 32, 33 and 34 arrange the allocation information, the scale factors and the samples in the correct sequence i.e. in the sequence as described hereinbefore. Moreover, the processing unit 30 has generated the synchronising information and the system information associated with the frame to be generated, in which said information stored in the units 32, 33 and 34 should be inserted.

In the shown position of the switching means 40 the synchronising and system information for a frame is supplied by the generator 31 and fed to the output 7. Subsequently, the switch 40 is set to the second position from the top under the influence of the control signal supplied by the CPU 30. via the line 53 so that the output of the generator 32 is coupled to the output 7. Now the allocation information is applied to the output 7 by the generator 32. The sequence of the allocation information is as described with reference to FIG. 10 or 11. After this the switch 40 is set to the third position from the top. This means that the output of the generator 33 is coupled to the output 7. The generator 33 now supplies the scale factors in the correct sequence to the output 7. The switch 40 is now set to the next position, so that the output of the generator 34 is coupled to the output 7. Now the generator 34 supplies the samples in the various subbands in the correct sequence to the output 7. In this cycle exactly one frame is applied to the output 7. Subsequently, the switch 40 is reset to the top position. A new cycle is started, in which a subsequent block of 12 samples for each subband is encoded and a subsequent frame can be generated on the output 7. In some cases, for example if the sample frequency $F_s$ is 44.1 kHz, see FIG. 5, an additional information packet (the dummy slot, see FIG. 2) must be added. In that case the switch will be set from the position in which the generator 34 is coupled to the bottom position. The output of the generator 35 is now coupled to the output 7. Now the generator 35 generates the additional information packet IP P'+1, which is applied to the output 7. After this the switch 40 is reset to the top position to start the next cycle.

It is obvious that, if the signal received by the transmitter is to be corrected for errors caused during transmission of the signal, a specific channel coding should be applied to the second digital signal. In addition, it is required to modulate the second digital signal prior to transmission of the second signal. Thus, a digital signal is transmitted via the transmission medium, which signal may not be directly identifiable as the second signal but which has been derived therefrom. Further, it is to be noted that, for example in the case that the subbands have different widths, the number of samples for the various subbands inserted in one third frame portion may differ and are likely to differ. It is assumed, for example, that a division into three subbands is used, a lower subband $SB_1$, a central subband $SB_2$ and a upper subband $SB_3$. The upper subband $SB_3$ will have a bandwidth which is, for example, twice as large as that of the other two subbands. This means that the number of samples inserted in the third frame portion for the subband $SB_3$ is also twice as large as for each of the other subbands. The sequence in which the samples are applied to the reconstruction filter in the receiver may then be: the first sample of $SB_1$, the first sample of $SB_3$, the first sample of $SB_2$, the second sample of $SB_3$, the second sample of $SB_1$, the third sample of $SB_3$, the second sample of $SB_2$, the fourth sample of $SB_3$, . . . . etc. The sequence in which the allocation information for these subbands is then inserted in the second frame portion is now: first the allocation word for $SB_1$, then the allocation word of $SB_3$, subsequently the allocation word for $SB_2$. The same applies to the scale factors. Moreover, the receiver can derive from the system information that in this case the cycle comprises groups of four samples each, each group comprising one sample of $SB_1$, one sample of $SB_3$, one sample of $SB_2$ and subsequently another sample of $SB_3$.

Other Frame Arrangements

Figures 17, 18:
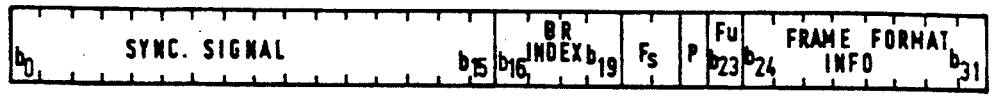
FIG. 17 shows another structure of the first frame portion of a frame.
FIG. 18 shows the system information included in the first frame portion illustrated in FIG. 17, FIGS. 19 and 20 show in more detail the information in the first frame portion illustrated in FIG. 17, FIGS. 21 and 22(a)-22(d) illustrate the sequence in which the allocation information is accommodated in the second frame portion associated with the first frame portion of FIG. 17, FIG. 23 gives the structure of a frame filled with an additional signal.

FIG. 17 shows another structure of the first frame portion FD1. Again the first frame portion FD1 contains exactly 32 bits and therefore corresponds to one information packet. The first 16 bits again constitute the synchronising signal (or synchronisation word). The synchronisation word may again be the same as the synchronisation word of the first frame portion FD1 in FIG. 3. The information accommodated in bits 16 through 31 differs from the information in bits 16 through 31 in FIG. 3. The bits $b_{16}$ through $b_{19}$ represent the bit rate index (BR index). The bit rate index is a 4-bit number whose rate index is equal to the 4-bit digital number '0000' this denotes the free-format condition, which means that the bit rate is not specified and that the decoder has to depend upon the synchronisation word alone to detect the beginning of a new frame. The 4-bit digital number '1111' is not employed in order not to disturb the synchronisation word detection. In the second column of the Table in FIG. 18 the bit rate index is represented as a decimal number corresponding to the 4-bit digital number. The corresponding bit rate values are given in column 1.

The bits 20 and 21 represent the sample frequency $F_s$, see FIG. 18.

FIG. 18 shows the four possible 2-bit digital numbers for the bits $b_{20}$ and $b_{21}$ and the associated sample frequency. Bit 22 indicates whether the frame comprises a dummy slot, in which case $b_{22}$='1', or does not comprise a dummy slot, in which case $b_{22}$='0'. The information in the bits $b_{16}$ through $b_{22}$ makes it possible to determine how many information packets are actually present in the frame. This means again that the first frame portion contains information related to the number of information packets in the frame. As $n_s$ is known, which is the number of samples of the wide-band signal whose corresponding information belonging to the second digital signal is accommodated in one frame, in the present example $n_s$=384, it is possible to determine how many information packets B are present in the frame by means of the data in the Table in FIG. 8, the padding bit $b_{22}$ and the formula $$P = \frac{BR}{N} \times \frac{n_s}{F_s}.$$

The bit $b_{23}$ is intended for specifying a future extension of the system. This future extension will be described hereinafter. For the time being this bit is assumed to be '1'. The content of the first frame portion, as regards the bits $b_{24}$ through $b_{31}$, will be described with reference to FIGS. 19 and 20. The bits $b_{24}$ and $b_{25}$ give the mode indication for the audio signal.

For the four possibilities of this two-bit digital number FIG. 20 shows whether the wide-band digital signal is a stereo audio signal ('00'), a mono signal ('11'), a bilingual signal ('10'), or an intensity stereo audio signal ('01'). In the last-mentioned case the bits 26 and 27 indicate which subbands have been processed in accordance with the intensity stereo method. FIG. 20 indicates for the respective two-bit numbers "00", '01', '10', and '11' that the subbands 13-32 and 17-32 have been processed in accordance with the intensity stereo method. As stated hereinbefore intensity stereo can be applied to the higher subbands because the ear is less phase-sensitive for the frequencies in these subbands. The bit $b_{28}$ can be used as a copyright bit. If this bit is '1' this means that the information is copy-protected and should/cannot be copied. The bit $b_{29}$ can indicate that the information is original information ($b_{29}$='1'), for example in the case of the prerecorded tapes, or information which has been copied ($b_{29}$='0'). The bits $b_{30}$ and $b_{31}$ specify the emphasis which may have been applied to the wide-band signal in the transmitter, see also the lo description with reference to FIG. 7.

Hereinafter, another configuration of the second frame portion FD2 will be described for the various mode indications represented by the bits $b_{24}$ through $b_{27}$ in the first frame portion. Again the second frame portion comprises the 4-bit allocation words whose meaning has been described with reference to FIG. 9. For the stereo mode ($b_{24}$, $b_{25}$=00) and the bilingual mode $b_{25}$=10) the second frame portion FD2 again has a length of 8 information packets (slots) and is composed as described with reference to FIG. 10. In the stereo mode 'II' in FIG. 10 then represents, for example, the left-channel component and 'II' the right channel component. For the bilingual mode 'I' denotes one language and 'II' denotes the other language. For the mono mode ($b_{24}$, $b_{25}$=11) the length of the second frame portion FD2 is of course only 4 information packets (slots). FIG. 21 illustrates the sequence of the allocation words for the various subbands 1 through 32 in the four information packets (slots) 2 through 5. Thus, every quantity M-i represents a four-bit allocation word which specifies the number of bits in every sample in the subband of the sequence number i, i ranging from 1 to 32. In the intensity stereo mode ($b_{24}$, $b_{25}=01$) there are four possibilities indicated by means of the bits $b_{26}$ and $b_{27}$, see FIG. 20. All these possibilities result in a different content of the second frame portion FD2.

FIGS. 22a to 22d illustrate the four different contents of the second frame portion. If the switch bits $b_{26}$, $b_{27}$ are '00' the signals in the subbands 1 through 4 are normal stereo signals and the signals in the subbands 5 through 32 are intensity-stereo signals. This means that for the subbands 1 through 4 for the left-hand and right-hand channel components in these subbands the associated allocation words should be stored in the second frame portion. In FIG. 22a this is represented by the consecutive allocation words AW (1, 1); AW (R, 1); AW (1, 2); AW (R, 2); . . . AW (R, 4), stored in the slot 2 of the frame, i.e. the first slot of the second frame portion. FIG. 22a only gives the indices (i-j) of the allocation words, i being equal to L or R and indicating the left-hand and the right-hand channel component respectively, and j ranging from 1 through 4 and representing the sequence number of the subband. For the subbands 5 through 32 the left-hand and the right-hand channel components contain the same series of samples. The only difference resides in the scale factors for the left-hand and the right-hand channel components in a subband. Consequently, such a subband requires only one allocation word. The allocation words AW (i, j) for these subbands 5 through 32 are indicated by the indices M-j, where i is consequently equal to M for all the subbands and where j ranges from 5 through 32.

FIG. 22a shows that $4\frac{1}{2}$ information packets are required for inserting the 36 allocation words in the second frame portion. If the switch bits $b_{26}$, $b_{27}$ are '01' the signals in the subbands 1 through 8 will be normal stereo signals and the signals in the subbands 9 through 32 will be intensity-stereo signals. This means that for each of the subbands 1 through 8 two allocation words AW(L, j) and AW(R,j) are required and that for each of the subbands 9 through 32 only one allocation word AW(M,j) is required. This implies that in total 40 allocation words are needed, included in five information packets (slots), i.e. IP2 through IP6, of the frame. This is illustrated in FIG. 22b. In this case the second frame portion FD2 has a length of five information packets (slots).

If the switch bits $b_{26}$, $b_{27}$ are '10' the signals in the subbands 1 through 12 will be normal stereo signals and the signals in the subbands 13 through 32 will be intensity-stereo signals. FIG. 22c gives the structure of the second frame portion FD2 with the allocation words for the various subbands. The second frame portion now has a length of $5\frac{1}{2}$ information packets (slots) in order to accommodate all the allocation words. If the switch bits $b_{26}$, $b_{27}$ are '11' the signals in the subbands 1 through 16 will be normal stereo signals and the signals in the subbands 17 through 32 will be intensity-stereo signals. Now 48 allocation words are needed, which are inserted in the second frame portion, which then has a length of 6 information packets (slots), see FIG. 22d.

What has been stated above about the scale factors is also valid here. When it is assumed that an allocation word 0000 has been assigned neither to any of the subbands nor to any of the channels, 64 scale factors are required both for the stereo mode and for the intensity-stereo modes. This is because in all the intensity-stereo modes every mono subband should have two scale factors to enable intensity-stereo to be realised for the left-hand and the right-hand channel in this subband, see FIG. 15c.

It is obvious that in the mono mode the number of scale factors is halved, i.e. 32, again assuming that the allocation word 0000 has not been assigned to any of the subbands.

Scale Factor Determination

A method of determining the 6-bit scale factors will now be explained below. As stated hereinbefore, the sample having the largest absolute value is determined for every 12 samples of a subband channel.

FIG. 24a shows this maximal sample $|S_{max}|$. The first bit, designated SGN, is the sign bit and is '0' because it relates to the absolute value of $S_{max}$. The samples are represented in two's complement notation. The sample comprises k 'zeros' followed by a "1". The values of the other bits of the 24-bit digital number are not relevant and can be either '0' or '1'.

$|S_{max}|$ is now multiplied by $2^k$, see FIG. 24b. Subsequently $|S_{max}|.2^k$ is compared with a digital number $DV_1$ equal to 010100001100000000000000 and a digital number $DV_2$ equal to 011001100000000000000000. If $|S_{max}|.2^k \geq DV_1$ a specific constant p is taken to be 2. If $DV_1 \leq |S_{max}|.2^k \geq DV_2$, then p is taken to be 1. If $|S_{max}|.2^k \geq DV_2$, then p=0. The number k is limited to $0 \leq k \leq 20$. The scale factor is now determined by the numbers k and p in accordance with the following formula.

$$SF = 3k + p.$$

Consequently, the maximum value for SF is 62. This means that the scale factors can be represented by 6-bit numbers, the six-bit number 111111 (which corresponds to the decimal number 63) not being used. In fact, the 6-bit binary numbers are not the scale factors but they are in a uniquely defined relationship with the actual scale factors, as will be set forth below. All the 12 samples S are now multiplied by a number which is related to the values for k and p. The 12 samples are each multiplied as follows.

$$S' = S \times 2^k \times g(p)$$

where the number g(p) has the following relation with p:

$$g(p) = 1 \text{ for } p = 0$$

$$g(p) = 1 + 2^{-2} + 2^{-8} + 2^{-10} + 2^{-16} + 2^{-18} + 2^{-23}$$
$$\text{for } p = 1$$

$$g(p) = 1 + 2^{-1} + 2^{-4} + 2^{-6} + 2^{-8} + 2^{-9} + 2^{-10} + 2^{-13} +$$
$$2^{-15} + 2^{-16} 2^{-17} + 2^{-19} + 2^{-20} \text{ for } p = 2.$$

The parameter k specifies the number of 6 dB steps and the factors (g(1) and g(2) are the closest approximations to steps of 2 dB. The samples S' thus scaled are now quantised to enable them to be represented by q-bit digital numbers in two's complement notation. In FIG. 25 this is illustrated for q=3. The scaled samples S' have values between +1 and -1, see FIG. 25a. In the quantiser these samples must be represented by q bits, q corresponding to the allocation value for the relevant subband (channel). Since, as stated above, the q-bit digital number comprising only 'ones' is not used to represent a sample the total interval from -1 to +1 should be divided over $2^{q-1}$ smaller intervals. For this purpose the scaled samples S' are transformed into the samples S'' in accordance with the formula $S''=S'(1-2^{-q})-2^{-q}$.

The samples S'' are subsequently truncated at q see FIG. 25c. Since the '111' representation is not permissible the sign bits are inverted, see FIG. 25d. The q(=3)-bit numbers given in FIG. 25d are now inserted in the third frame portion FD3, see FIG. 2.

Samples S' which comply with $-0.71 \leq S' \leq -0.14$ are represented by the digital number '001'. This proceeds which comply with $0.71 \leq S' < 1$ and which are represented by the digital number '110'. Consequently, the digital number '111' is not used.

Dequantization at the receiving side is effected in a manner inverse to the quantization at the transmission side, see FIG. 26. This means that first the sign bits of the q-bit digital numbers are inverted to obtain the normal two's complement notation, see FIG. 26b.

Subsequently the samples S' are derived from the transformed samples S'' by means of the formula $S'=(S''+2^{-q+1})(1+2^{-q}+2^{-2q}+2^{-3q}+2^{-4q}+\ldots)$, see FIGS. 26c and 26d.

The values S' thus obtained are now situated exactly within the original intervals in FIG. 25a. At the receiving side the samples S' are subsequently scaled to the original amplitudes by means of the transmitted information k, p which is related to the scale factors. Thus, at the receiving side a number g'(p) complies with:

$g'(p)=1$ for $p=0$ $g'(p)=2^{-1}+2^{-2}+2^{-5}+2^{-6}$ for $p=1$ $g'(p)=2^{-1}+2^{-3}+2^{-8}+2^{-9}$ for $p=2$.

Scaling to the original amplitudes is now effected using the following formula:

$S=S'.2^{-k}.g'(p)$.

In the two possible versions of a frame as described with reference to FIGS. 2 and 3 and FIGS. 2, 17 and 19 respectively the third frame portion may not be filled entirely with information. This will occur more often and sooner as the algorithms for subband coding, i.e. the entire process of dividing the signal into subband signals and the subsequent quantization of the samples in the various subbands, are improved. In particular, this will enable the information to be transmitted with a smaller number of bits (average number per sample). The unused part of the third frame portion can then be utilized for transmitting additional information. In the first frame portion FD1 in FIG. 17 allowance has been made for this by means of the "future-use" bit $b_{23}$. Normally, this bit is '0', as will be apparent from FIG. 18.

If an additional signal has been inserted in the third frame portion FD3 of a frame, the future-use bit $b_{23}$ in the first frame portion FD1, see FIG. 17, will be '1'. During reading of the first frame portion FD1 this makes it possible for the receiver to detect the frame contains additional information. The allocation information and the scale factors, see FIG. 23, inform the receiver that only the part of the third frame portion FD3, marked FD4 in FIG. 23, contains quantised samples of the subband signals. The remainder, marked FD5 in FIG. 23, now contains the additional information. The first bits in this frame portion FD5 are designated 'EXT INFO' or extension information. These bits indicate the type of additional information. The additional information may be, for example, an additional audio channel, for example for the transmission of a second stereo channel. Another possibility is to use these two additional audio channels to realise 'surround sound' together with the audio subband signals in the frame portion FD4. In that case the front-rear information required for surround sound may be included in the frame portion FD5. In the part marked FD6 the frame portion FD5 may again contain allocation information, scale factors and samples (in this order) and the sequence of the allocation words and the scale factors may then be similar to the sequence as described with reference to FIGS. 2 and 3 and FIGS. 2, 17 and 19.

In the case of 'surround sound' simple receivers may merely decode the stereo audio information in the frame portions FD2 and FD3, except for the frame portion FD5. More sophisticated receivers are then capable of reproducing the surround-sound information and for this purpose they also employ the information in the frame portion FD5.

The extension-info bits may also indicate that the information in the frame portion FD6 relates to text, for example in the form of ASCII characters. It may even be considered to insert video or picture information in the frame portion FD6, said information again being characterized by the extension-info bits.

It is to be noted that the invention is not limited to the embodiments shown herein. The invention also relates to those embodiments which differ from the embodiments shown herein with respect to features which are not relevant to the invention as defined in the claims.

I claim:

1. A digital transmission system comprising a transmitter and a receiver, for transmitting wide-band digital information having a sample frequency F, via a transmission medium, and for receiving said information, said transmitter having an input terminal for receiving said information to be transmitted, in the form of a first digital signal; an output; and a signal source, having an input coupled to said input terminal, for generating and supplying to said output a second digital signal which includes said information, said second digital signal comprising consecutive frames, each frame comprising a plurality of information packets, and each information packet comprising N bits, where $N>1$, said receiver comprising a decoder and an output terminal, said decoder having an input for receiving said second digital signal and an output coupled to said output terminal for supplying said wide-band digital information, characterized in that, in the formula $$P = \frac{BR}{N} \times \frac{n_s}{F_s}$$

where BR is the bit rate of said second digital signal, and $n_s$ is the number of samples of said information whose corresponding information in said second signal is included in one frame of said second signal, if P is an integer, the number of information packets in one frame is P, and if P is not an integer, the number of information packets in a number v of the frames is P', where P' is the highest integer whose value is less than P; and the number of information packets in a number w of the other frames is p'+1, the numbers v and w being selected such that the average frame rate of said second digital signal is substantially equal to $F_s/n_s$, and that each frame comprises at least a first frame portion including synchronizing information.

2. A transmission system as claimed in claim 1, characterized in that the first frame portion contains further information related to the number of information packets in the frame.

3. A transmission system as claimed in claim 1, characterized in that a frame comprises a first frame portion, a second frame portion and a third frame portion, the first frame portion further including system information and the second and the third frame portion including signal information.

4. A transmission system as claimed in claim 1, characterized in that if a frame comprises P'+1 information packets, the first frame portion contains information corresponding to P'.

5. A transmission system as claimed in claim 3, the transmitter comprising a coder comprising signal-splitting means responsive to the first digital signal to generate said second digital signal in the form of a number of M subsignals, M being larger than 1, and comprising means for quantising the respective subsignals, characterized in that the second frame portion of a frame contains allocation information which, for at least a number of subsignals, indicates the number of bits representing the samples of the quantised subsignals derived from said subsignals, and in that the third frame portion contains the samples of at least said quantised subsignals.

6. A transmission system as claimed in claim 5, in which the signal-splitting means take the form of analysis-filter means responsive to the first digital signal to generate a number of M subband signals, which analysis-filter means divide the signal band of the first digital signal, applying sample-frequency reduction, into successive subbands having band numbers m increasing with the frequency, and in which the quantisation means are adapted to quantise the respective subband signals block by block, characterized in that for at least a number of the subband signals the allocation information in the second frame portion of a frame specifies the number of bits representing the samples of the quantised subband signals derived from said subband signals, and in that the third frame portion contains the samples of at least said quantised subband signals.

7. A transmission system as claimed in claim 6, characterized in that in addition the third frame portion includes information related to scale factors, a scale factor being associated with at least one of the quantised subband signals contained in the third frame portion, and in that the scale factor information is included in the third frame portion before the quantised subband signals.

8. A transmission system as claimed in claim 6, in which the receiver decoder comprises synthesis-filter means responsive to the respective quantised subband signals to construct a replica of the first digital signal, which synthesis filter means combine the subbands, applying sample frequency restoration to form the signal band of the first digital signal, characterized in that said samples of the quantized subband signals are inserted in the third frame portion in a sequence corresponding to the sequence in which said samples are applied to the synthesis-filter means upon reception in the receiver.

9. A transmission system as claimed in claim 8, characterized in that the allocation information for the various quantised subband signals is inserted in the second frame portion in a similar sequence.

10. A transmission system as claimed in claim 9, characterized in that in addition the third frame portion includes information related to scale factor, a scale factor being associated with at least one of the quantised subband signals contained in the third frame portion, and in that the scale factor information is included in the third frame portion before the quantised subband signals, and the scale information for the scale factors is inserted in the third frame portion in a sequence corresponding to the sequence in which the allocation information for the quantised subband signals associated with said scale factors is included in the second frame portion.

11. A transmission system as claimed in claim 6, the first digital signal comprising a first and a second signal component, the analysis-filter means being adapted to be responsive to the first and the second signal components to generate a number of M subband signals, each subband signal comprising a first and a second subband signal component, the means being further adapted to quantise the respective first and second subband signal components in a specific subband, characterized in that the second frame portion of a frame includes allocation information specifying for said specific subband the number of bits representing the samples of the quantised first and second subband signal components derived from each of the two subband signals of said specific subband, and in that the third frame portion includes samples of said quantised first and second subband signal components.

12. A transmission system as claimed in claim 11, characterized in that in addition the third frame portion includes information related to scale factor, a scale factor being associated with at least one of the quantised subband signals contained in the third frame portion, and in that the scale factor information is included in the third frame portion before the quantised subband signals, and the third frame portion includes scale-factor information for two scale factors for said specific subband, each scale factor belonging to the first or the second quantised subband signal component of said subband.

13. A transmission system as claimed in claim 11, in which the receiver decoder comprises synthesis filter means responsive to the respective quantised subband signal components to construct a replica of the first digital signal comprising the first and the second signal component, characterized in that the samples of the subband signal components (if present) are inserted in the third frame portion in a sequence corresponding to the sequence in which the samples of said subband signal components are applied to the synthesis filter means upon reception in the receiver.

14. A transmission system as claimed in claim 13, characterized in that the allocation information for the various quantised subband signal components is inserted in the second frame portion in a similar sequence.

15. A transmission system as claimed in claim 14, characterized in that in addition the third frame portion includes information related to scale factor, a scale factor being associated with at least one of the quantised subband signals contained in the third frame portion, and in that the scale factor information is included in the third frame portion before the quantised subband signals, and the scale-factor information for the scale factors is inserted in the third frame portion in a sequence corresponding to the sequence in which the allocation information for the first and second quantised subband signal components belonging to said scale factors are inserted in the second frame portion, and in that the scale-factor information is inserted in the third frame portion before said samples of the quantised subband signal components.

16. A transmission system as claimed in claim 5, characterized in that the (P'+1)-st information packet does not contain any useful information.

17. A transmission system as claimed in claim 3, characterized in that the frames comprise a fourth frame portion in which error-detection and/or error-correction information is included.

18. A transmission system as claimed in claim 2, characterized in that a frame comprises a first frame portion, second frame portion and a third frame portion, the first frame portion further including system information and the second and the third frame portion including signal information.

19. A transmission system as claimed in claim 2, characterized in that if a frame comprises P'+1 information packets, the first frame portion contains information corresponding to the value P'.

20. A transmission system as claimed in claim 19, the transmitter comprising a coder comprising signal-splitting means responsive to the first digital signal to generate said second digital signal in the form of a number of M subsignals, M being larger than 1, and comprising means for quantising the respective subsignals, characterized in that the second frame portion of a frame contains allocation information which, for at least a number of subsignals, indicates the number of bits representing the samples of the quantised subsignals derived from said subsignals, and in that the third frame portion contains the samples of at least said quantised subsignals.

21. A transmission system as claimed in claim 3, characterized in that if a frame comprises P'+1 information packets, the first frame portion contains information corresponding to the value P'.

22. A transmission system as claimed in claim 21, the transmitter comprising a coder comprising signal-splitting means responsive to the first digital signal to generate said second digital signal in the form of a number of M subsignals, M being larger than 1, and comprising means for quantising the respective subsignals, characterized in that the second frame portion of a frame contains allocation information which, for at least a number of subsignals, indicates the number of bits representing the samples of the quantised subsignals derived from said subsignals, and in that the third frame portion contains the samples of at least said quantised subsignals.

23. A transmission system as claimed in claim 7, in which the receiver decoder comprises synthesis-filter means responsive to the respective quantised subband signals to construct a replica of the first digital signal, which synthesis filter means combine the subbands, applying sample frequency restoration to form the signal band of the wide-band digital signal, characterized in that the samples of the subband signals are inserted in the third frame portion in a sequence corresponding to the sequence in which said samples are applied to the synthesis-filter means upon reception in the receiver.

24. A transmitter for transmitting wide-band digital information having a sample frequency F, via a transmission medium, comprising:

an input terminal for receiving said information to be transmitted, in the form of a first digital signal,
an output, and
a signal source, having an input coupled to said input terminal, for generating and supplying to said output a second digital signal which includes said information, said second digital signal comprising consecutive frames, each frame comprising a plurality of information packets, and each information packet comprising N bits, where N>1,
characterized in that, in the formula $$P = \frac{BR}{N} \times \frac{n_s}{F_s}$$

where BR is the bit rate of said second digital signal, and $n_s$ is the number of samples of said information whose corresponding information in said second signal is included in one frame of said second signal,
if P is an integer, the number of information packets in one frame is P, and
if P is not an integer, the number of information packets in a number v of the frames is P', where P' is the highest integer whose value is less than P; and the number of information packets in a number w of the other frames is p'+1, the numbers v and w being selected such that the average frame rate of said second digital signal is substantially equal to $F_s/n_s$, and that each frame comprises at least a first frame portion including synchronizing information.

25. A transmitter as claimed in claim 24, where said transmission medium is a record carrier, said transmitter being formed as a device for recording said second digital signal in a track on said record carrier.

26. A receiver for receiving wide-band digital information having a sample frequency $F_s$ transmitted over a transmission medium, having an output at which said information is provided in the form of a first digital signal, and a decoder for receiving said information in the form of an encoded second digital signal which comprises consecutive frames, each frame comprising a plurality of information packets, and each information packet comprising N bits, where N>1,
characterized in that, in the formula $$P = \frac{BR}{N} \times \frac{n_s}{F_s}$$

where BR is the bit rate of said second digital signal, and $n_s$ is the number of samples of said information whose corresponding information in said second signal is included in one frame of said second signal,
if P is an integer, the number of information packets in one frame is P, and
if P is not an integer, the number of information packets in a number v of the frames is P', where P' is the highest integer whose value is less than P; and the number of information packets in a number w of the other frames is p'+1, the numbers v and w being selected such that the average frame rate of said second digital signal is substantially equal to $F_s/n_s$, and that each frame comprises at least a first frame portion including synchronizing information.

27. A receiver as claimed in claim 26, characterized in that said transmission medium is a record carrier, and that said receiver is formed as a device for reading said second digital signal from a track on said record carrier.

28. A system as claimed in claim 1, wherein a same number $n_s$ of samples of said information are included in each said frame of said second signal.

29. A system as claimed in claim 5, wherein said number $n_s$ is 384.

30. A transmitter as claimed in claim 24, wherein a same number $n_s$ of samples of said information are included in each said frame of said second signal.

31. A transmitter as claimed in claim 25, wherein said number $n_s$ is 384.

32. A receiver as claimed in claim 26, wherein a same number $n_s$ of samples of said information are included in each said frame of said second signal.

33. A receiver as claimed in claim 27, wherein said number $n_s$ is 384.

* * * * *

UNITED STATES PATENT AND TRADEMARK OFFICE
CERTIFICATE OF CORRECTION

PATENT NO.   : 5,323,396
DATED        : June 21, 1994
INVENTOR(S)  : Gerardus C.P. Lokhoff It is certified that error appears in the above-identified patent and that said Letters Patent is hereby corrected as shown below:

Column 24,
Line 36, change "F," to -- $F_s$ --.

Column 27,
Line 11, after "that" insert -- one of said frames comprises P'+1 information packets, and --.
Line 67, change "F," to -- $F_s$ --.

Signed and Sealed this

Twenty-ninth Day of October, 2002

Attest:

JAMES E. ROGAN
Attesting Officer     Director of the United States Patent and Trademark Office

(12) EX PARTE REEXAMINATION CERTIFICATE (7307th)
United States Patent
Lokhoff

(10) Number: US 5,323,396 C1
(45) Certificate Issued: Jan. 12, 2010

(54) DIGITAL TRANSMISSION SYSTEM, TRANSMITTER AND RECEIVER FOR USE IN THE TRANSMISSION SYSTEM

(75) Inventor: Gerardus C. P. Lokhoff, Eindhoven (NL)

(73) Assignees: U.S. Philips Corporation, New York, NY (US); France Telecom and S.A. Telediffusion de France, Paris (FR); Institut fur Rundfunktechnik GmbH, Munich (DE)

Reexamination Request:
No. 90/009,345, Nov. 26, 2008

Reexamination Certificate for:
Patent No.: 5,323,396
Issued: Jun. 21, 1994
Appl. No.: 07/997,158
Filed: Dec. 21, 1992

Certificate of Correction issued Oct. 29, 2002.

Related U.S. Application Data

(63) Continuation of application No. 07/532,462, filed on Jun. 1, 1990, now abandoned.

(30) Foreign Application Priority Data

Jun. 2, 1989 (NL) .............................................. 8901402
Feb. 13, 1990 (NL) ............................................. 9000338

(51) Int. Cl.
H04J 3/16 (2006.01)
H04J 3/06 (2006.01)
G11B 5/09 (2006.01)
H04B 1/66 (2006.01)
G10L 19/00 (2006.01)

(52) U.S. Cl. .......................... 370/468; 360/48; 370/471; 370/509; 375/241; 704/201

(58) Field of Classification Search .................. None
See application file for complete search history.

(56) References Cited

U.S. PATENT DOCUMENTS

| | | |
|---|---|---|
| 4,573,034 A | 2/1986 | Schouhamer Immink |
| 4,899,384 A | 2/1990 | Crouse et al. |
| 4,972,484 A | 11/1990 | Theile et al. |
| 5,161,210 A | 11/1992 | Druyvesteyn et al. |
| 5,241,535 A | 8/1993 | Yoshikawa |
| 5,365,552 A | 11/1994 | Astle |
| 5,367,608 A | 11/1994 | Veldhuis et al. |
| 5,440,596 A | 8/1995 | Kneepkens et al. |
| 5,463,565 A | 10/1995 | Cookson et al. |
| 5,487,067 A | 1/1996 | Matsushige |
| 5,491,773 A | 2/1996 | Veldhuis et al. |

FOREIGN PATENT DOCUMENTS

| | | |
|---|---|---|
| EP | 0273567 | 7/1988 |
| EP | 0372601 | 6/1990 |
| EP | 0484595 | 5/1992 |
| WO | WO 89/03157 | 4/1989 |
| WO | WO 92/12607 | 7/1992 |

OTHER PUBLICATIONS

Savagerd "Bit–Rate Reduction for High Quality Audio Signals Using Floating–Point Wave Digital Filters", Circuits and Systems, 1988 IEEE International Symposium.

(Continued)

*Primary Examiner*—Colin M Larose

(57) ABSTRACT

Digital data are transmitted as packets within frames, at an average frame rate equal to the sampling rate divided by the number of samples per frame. When, as a result of subband or other coding, the number of packets required per frame would not be an integer, frames containing the next lower integer are transmitted, followed by frames containing the next higher integer. Preferably a first portion of each frame contains synchronization information, a second portion contains allocation information, and a third contains samples of, and scale factor information for, the transmitted signal.

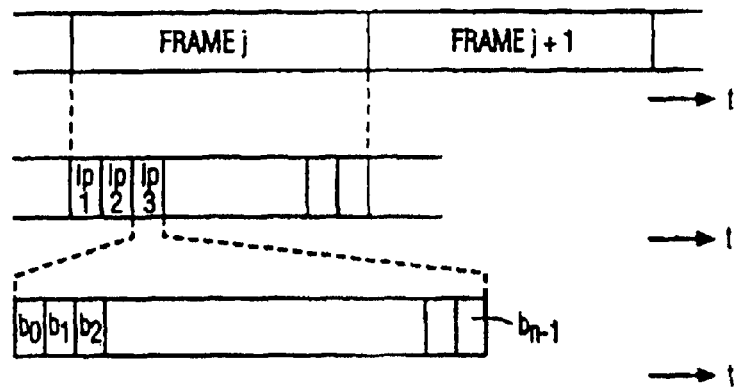

OTHER PUBLICATIONS

Gersho, A. "Speech Coding", Agard: Speech Analysis and Synthesis and Man–Machine Speech Communications for Air Operations, Agard Lecture Series No. 170, pp. 3–1 to 3–14, (1990).

"Musicam, Detailed description of sound coding algorithm," International Organization for Standardization, Oct. 18, 1989.

"Signalling in Parity—a brief history," Chambers, J. P., BBC Research Dept. vol. 15, 1985.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–33 is confirmed.

* * * * *